Figure 1:
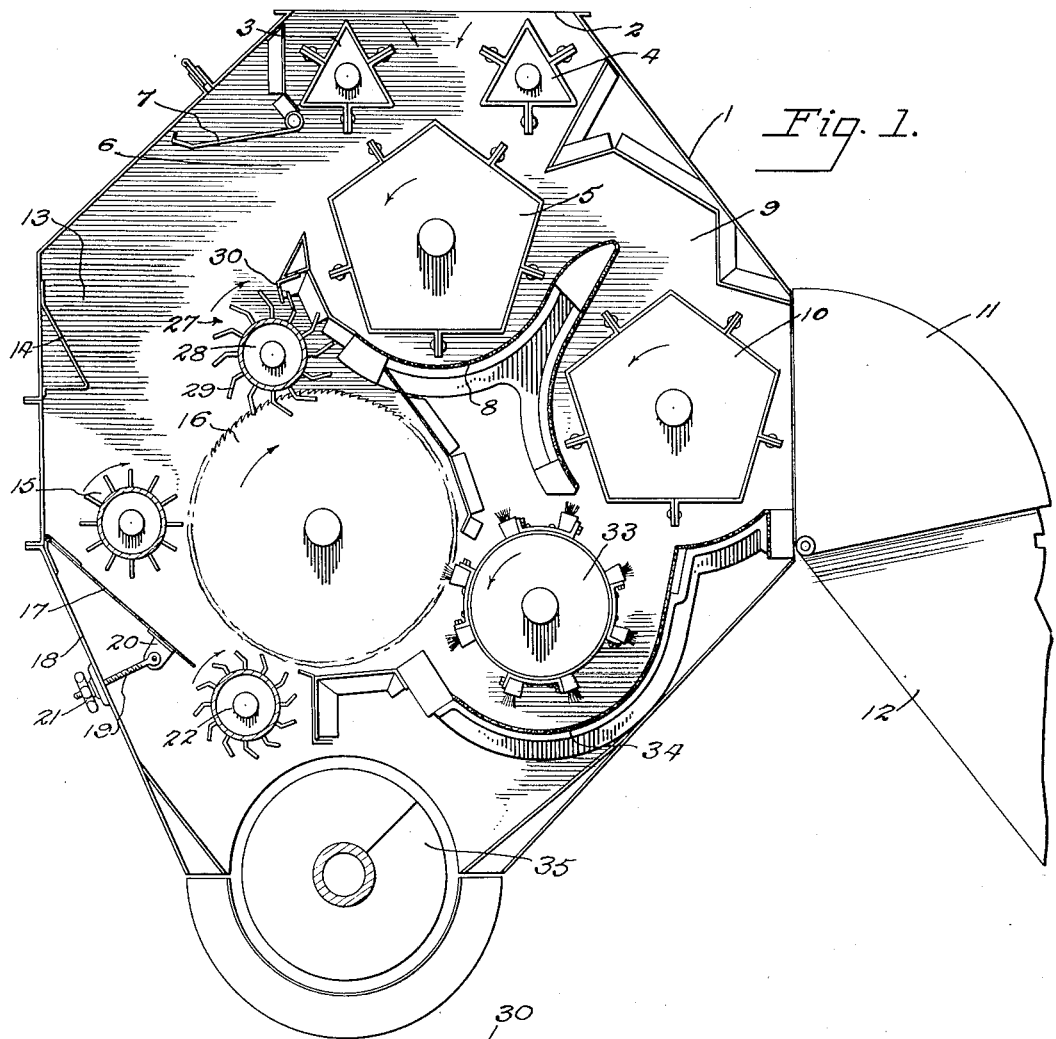

April 3, 1934.    J. J. WALLACE    1,953,545
HULL EXTRACTING UNIT
Filed May 11, 1933

Inventor
J. J. Wallace
By Mason Fenwick & Lawrence
Attorneys

Patented Apr. 3, 1934

1,953,545

UNITED STATES PATENT OFFICE 1,953,545

HULL EXTRACTING UNIT

Jeffrey John Wallace, Amite, La., assignor to Gullett Gin Company, Amite, La.

Application May 11, 1933, Serial No. 670,565

2 Claims. (Cl. 19—37)

This invention relates generally to machines for separating hulls from cotton, and more particularly to hull extracting cleaning feeders of this type.

The objects of the present invention may be best understood by reference to the prior art and to the defects in prior structures which this invention is designed to overcome.

One of the early types of hull extracting machines is illustrated in the patent to Wilson et al. No. 20,120, April 27, 1858. In this machine a series of stationary ribs are mounted in fixed position between the saws. Each rib is provided with a projection adapted to knock hulls or foreign material from the cotton carried up against them by the saw. This old type of hull extracting machine operated satisfactorily on cotton that had only a few hulls. As the method of picking cotton was changed, it became necessary to devise a machine of greater capacity. The demand for machines of greater capacity produced machines of the type illustrated in the patent to Taylor, No. 1,175,193, March 14, 1916, in which two ribs were substituted for the single rib of the Wilson patent to knock off or extract hulls and foreign material from cotton carried up by the saws. In each case, the separation of the hulls from the cotton is accomplished by a set, or sets, of ribs fixed in the spaces between the saws. However, in this type of separation, cotton and hulls when fed to the gin in a great quantity caused the ribs to choke up the machine. This defect greatly limited the capacity of these stationary rib type machines in handling roughly gathered and picked cotton.

To correct the defects of these rib type machines, a third type of hull extractor has come into use. In this third type, the saw cylinder is used in conjunction with a stripper cylinder mounted to rotate closely adjacent to the saw cylinder. These stripper cylinders are provided with radial bars adapted to act as kickers or knockers to prevent the passage of the hulls or foreign material with the saw cylinder. However, these bars must be arranged to pass very close to the teeth of the saw; because if there were too much space between the teeth of the saws and the ends of the bars the hulls and foreign material would pass through. This type of extractor employing stripper cylinders is not very effective and it is necessary either to build extra large machines in order to get capacity, or to multiply the number of saw cylinders and rotary strippers in the same machine in order to get a sufficient quantity through them to feed a gin.

Another disadvantage of this third type of hull separating machine, is that the stripper bars have to be angularly spaced around the circumference and do not extend into the spaces between the saws. Each stripper bar is therefore only effective in knocking back hulls at the instant when it passes over the saw cylinder and at only one point. In this type of machine, there is always an interval when the saw cylinders do not have any stripper bar directly in line with a radius drawn from its center. In these intervals some hulls escape and pass between the stripper cylinder and the saws. In other words, the stripper bars do not present a continuous obstruction to the hulls, and therefore allow some hulls to pass out with the cotton. To prevent this undesirable passage of hulls, as much as possible, the stripper cylinders are run at a very high speed, and this speed is detrimental to the cotton passing through the extractor. The third type of extractor was not as efficient so far as cleaning is concerned as those gins having the stationary ribs interposed between the saws. However, since these are units separate from the gin, they can be built larger and with a greater capacity for handling the cotton than the stationary rib type.

It is, therefore, the main object of the present invention to overcome the defects of the prior machines. In other words, the machine embodying the present invention is designed to act as a hull extracting feeder of great capacity in which the hulls carried up by the saws are positively removed by a novel stripper cylinder having teeth or stripper bars projecting into the spaces between adjacent saws.

A further object of the invention resides in the peculiar construction of the stripper cylinders whereby at least two of the stripper bars are always arranged in the path of movement of the hulls and cotton carried up by the saws.

Another object of the invention resides in the provision of a stripper plate arranged in the path of rotation of the stripper cylinder whereby the projecting stripper bars of the cylinder are continuously cleaned during the rotation thereof.

Other objects of the invention will become apparent as the detailed description thereof proceeds.

Figure 2:
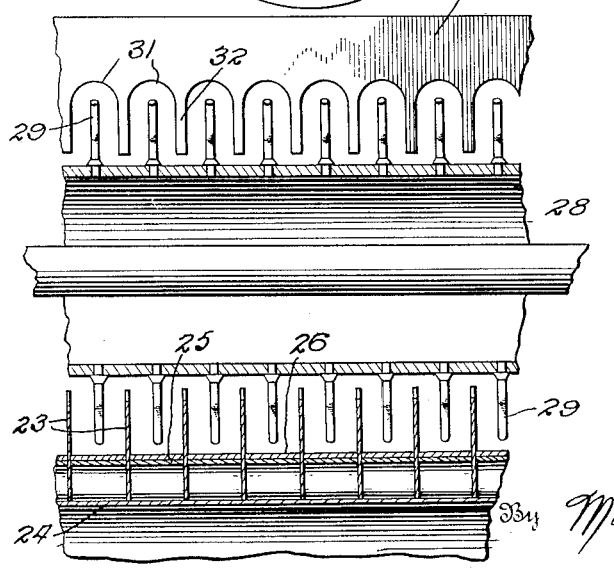

In the drawing:

Figure 1 is a central vertical section through a machine embodying the present invention; and Figure 2 is a fragmentary elevation to an enlarged scale, showing the cooperative relation between the saw cylinder of the machine, the stripper cylinder and the stripper plate.

As shown in the drawing, the machine comprises a casing 1 having an opening 2 at its upper end designed to receive cotton to be cleaned or hulled. Immediately below the inlet opening 2, a pair of feed rollers 3 and 4, rotatably mounted between the end walls of the casing 1 are employed to direct the cotton to be cleaned on to a cleaner drum 5. The cleaner drum 5 is mounted to rotate between the aforesaid end walls and directs the cotton received from the feed rollers 3 and 4 through a passage 6 controlled by a bypass valve plate 7 to the hull extracting part of the machine. When the valve plate 7 is closed, the cotton is directed by the cleaner drum 5 along a screen partition 8 to another passageway 9 leading to a second cleaner drum 10 which is mounted rotatably at the outlet hood 11. A spout 12, pivotally connected to the hood to direct the cleaned cotton to a roll box of a gin (not shown).

When the bypass valve 7 is open, the cotton is directed to the chamber 13, at the rear of the machine, and against a hull board 14 which directs the cotton downwardly toward a spiked roller 15 and a saw cylinder 16. The spiked roller 15 retards the effect of gravity on the hully cotton and presents the cotton to the teeth of the saws on the cylinder 16. An adjustable hull board 17 is pivoted at its upper end, below the spiked roller 15, to the rear wall 18 of the casing 1. The lower end of the hull board 17 may be adjusted by means of a screwthreaded rod 19 pivoted at one end to a lug 20 on the lower part of the hull board 17. An adjusting nut 21 engages the screwthreaded rod 19 to adjust the hull board so as to increase or decrease the space between the lower end of the hull board and a second spiked roller 22 arranged below and closely adjacent to the saw cylinder 16.

The annular saws 23 are mounted to fit snugly and slidably on a cylinder 24, and are spaced from each other by corrugated spacers 25. Cylindrical strips 26, of the same width as the spacers 25, enclose said spacers and present smooth cylindrical surfaces in the spaces between adjacent saws. This construction of saw cylinder is described in detail and claimed in my United States patent application, Serial No. 660,741, filed March 14, 1933. The type of saw just described is very well adapted for use with the stripper cylinder forming a part of this invention and having stripper bars projecting into the spaces between the saws to prevent the passage of hulls and foreign matter.

The stripper cylinder 27 is mounted to rotate about an axis parallel to the axis of rotation of the saw cylinder. In this case the stripper cylinder comprises a cylindrical member 28 having circular rows of stripper bars 29 projecting therefrom. The stripper bars of each cicular row are spaced apart angularly so that there are always at least two of said bars moving within the spaces between adjacent saws, and always to present some obstruction to the passageway of hulls and foreign material through those spaces. Directly above the stripper cylinder 27 a stripper plate 30 is secured to the partition 8. This plate 30 is provided with a series of serrations 31 adapted to receive the stripper bars 29, and to provide teeth 32 which extend between adjacent stripper bars to remove any hulls or foreign matter which might be carried up by said bars against the teeth of the stripper plate 30. The stripper bars 29 are slightly curved at their outer ends in order to permit the removal of hulls and cotton and foreign matter as said bars pass through the serrations 31 of the stripper plate 30.

At the forward side of the saw cylinder 16, a brush doffer 33 strips or brushes cotton off the saw cylinder and carries it along the screen 34 against the cleaning drum 10 at the outlet of the machine. The machine is provided at its lower end with an endless conveyor 35 adapted to carry off the hulls and foreign matter extracted from the cotton and falling through the various spaces and screens provided for that purpose.

No attempt is made herein to describe the various shafts and drive mechanism for supporting and rotating the cleaner drums, saw cylinder and stripper bars, because these details form no part of the present invention. The direction of rotation of the several parts of the device are clearly indicated by direction arrows applied to each element. The most important part of the invention resides in the stripper cylinder in combination with the saw cylinder and the stripper plate which cleans the stripper cylinder as it rotates during its stripping action adjacent the saw cylinder.

It is thought that the invention and numerous of its attendant advantages will be understood from the foregoing description and it is obvious that changes may be made in the form, construction and arrangement of the several parts without departing from the spirit or scope of my invention, or sacrificing any of its attendant advantages; the form herein described being a preferred embodiment for the purpose of illustrating my invention.

What I claim is:

1. In a hull extracting feeder, a casing, a saw cylinder rotatable therein, a stripper cylinder rotatable in said casing about an axis parallel to the axis of rotation of said saw cylinder, said stripper cylinder having bars extending into the spaces between the saws of said saw cylinder, and a plate fixed in said casing parallel to and above and slightly rearwardly of the axis of the stripper cylinder and having teeth extending into the spaces between said bars to clean said spaces.

2. In a hull extracting feeder, a casing, a saw cylinder rotatable therein, a stripper cylinder rotatable in said casing about an axis parallel to the axis of rotation of said saw cylinder, said stripper cylinder having bars extending into the spaces between the saws of said saw cylinder, and a plate fixed in said casing parallel to and above and slightly rearwardly of the axis of the stripper cylinder and having teeth extending into the spaces between said bars to clean said spaces, the free ends of said bars being curved to cooperate with said teeth to facilitate removal of material from said spaces.

JEFFREY JOHN WALLACE.